May 2, 1961   A. G. VAN SYOC, SR   2,982,424
FURNITURE CONSTRUCTION
Filed Dec. 3, 1958
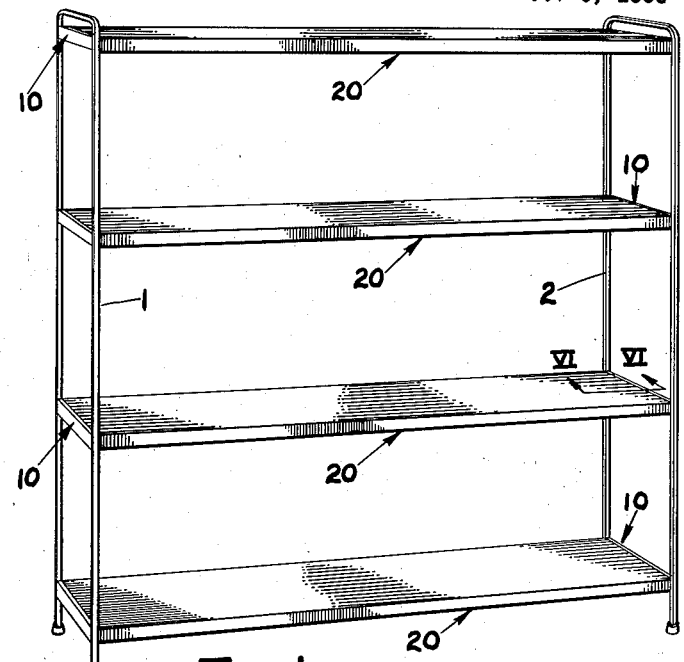
FIG. 1
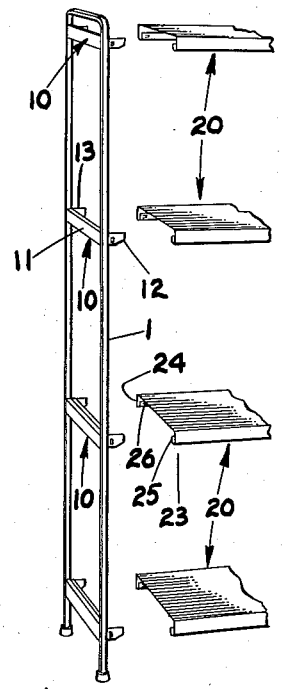
FIG. 2
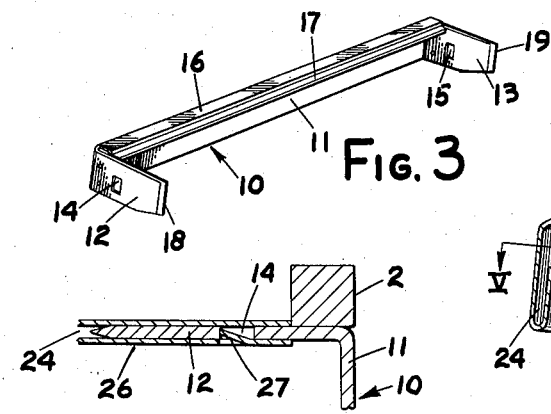
FIG. 3
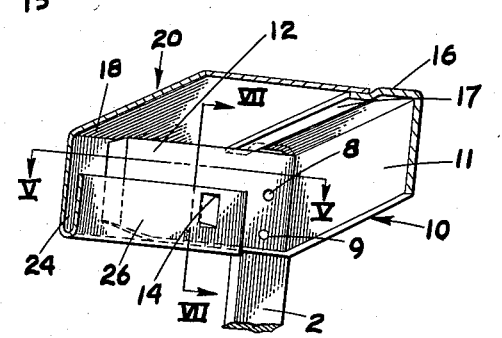
FIG. 4
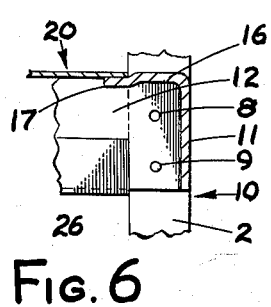
FIG. 5
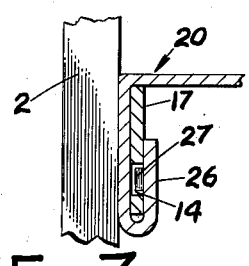
FIG. 6
FIG. 7
*INVENTOR.*
AUBURN G. VAN SYOC SR.
BY
ATTORNEYS United States Patent Office 2,982,424
Patented May 2, 1961

2,982,424

FURNITURE CONSTRUCTION

Auburn G. Van Syoc, Sr., Belding, Mich., assignor to Lu Van, Inc., Belding, Mich., a corporation of Michigan Filed Dec. 3, 1958, Ser. No. 777,901

7 Claims. (Cl. 211—148)

This invention relates to a furniture construction. More particulalry, this invention relates to a furniture construction of the type adapted to be shipped disassembled or knocked down and easily assembled by the purchaser with a minimum use of tools.

Due to the high cost of transit, many maufacturers attempt to ship furniture constructions disassembled in order to keep costs at a minimum. The shipment of large units of furniture in disassembled condition is also an important factor in the reduction of damage in transit. Large, relatively lightweight assemblies are easily bent or twisted during handling. However, if shipped disassembled as a compact package, they are rigid and the danger of injury is materially reduced. However, at least three basic conditions must be satisfied if furniture constructions are to be shipped in this manner. First, the ultimate purchaser of the furniture construction must be able to easily and quickly assemble it with a minimum use of tools. The assembly must be easily understood from comparatively simple instructions. Secondly, after the purchaser has assembled the furniture construction, it must be rigid and stable and must remain so during its use. It must be capable of withstanding racking, if the user is to be satisfied with the product. Thirdly, the assembled piece of furniture must be pleasing in appearance, free of exposed fasteners and unsightly seams and ridges which betray a "home made" job.

Up to the present time, furniuture constructions of this type have generally utilized threaded fasteners in their assembly. However, such connections have many inherent disadvantages. When assembling the furniture construction, one must have the correct tools, and sometimes special tools for those fasteners located in rather awkward positions. Along with requiring tools of a certain nature, such assembly requires time and patience. Because tolerance accumulations tend to misalign holes, when the parts are assembled, the fastener holes must be oversized. This materially reduces bearing. Though the structure may be rigid at first, racking will loosen the fasteners destroying the structure's rigidity. Ordinary use, for example, leaning on the furniture construction, moving it, bumping into it, and so on, will induce racking which is certain to initiate this loss of rigidity. It is obvious that such connections will continually need tightening and after a period of use, even tightening will not suffice to restore rigidity. Thus, the useable life of the furniture is reduced because of an improper connection.

Still further, conventional fasteners are difficult to conceal and when exposed detract from the furniture's appearance. It is difficult to paint the exposed positions of conventional fasteners and if painting is attempted, it will soon chip when tightening is necessary, rendering the appearance of the furniture construction worse than if they had never been painted at all. Clean, unbroken lines in the furniture construction cannot be achieved with removable fastener connections. Rivets are not practical since the average purchaser lacks equipment for their installation.

It is an object of this invention to provide a furniture construction which is pleasing in appearance. The embodiment of this invention shown in the drawings is especially well adapted to be used as a room divider. However, it will be obvious that the principles described herein may be used in many types of furniture constructions, for example, bookcases.

An understanding of these principles will disclose that a furniture construction may be provided which has straight, clean lines, free of unsightly nuts and bolts.

It is another object of this invention to provide a furniture construction which may be assembled by the ultimate purchaser thereof very quickly and easily, with a minimum use of tools. The furniture construction provided is rigid when assembled and will remain so during use. The teachings of this invention disclose a simple and inexpensively manufactured furniture construction. The many disadvantages of detachable fastener connections are entirely eliminated. The manufacturer is able to ship the furniture knocked down or disassembled and be assured that any ultimate purchaser will be able to assemble it and be entirely satisfied with its rigidity and stability.

These and other objects of this invention will become obvious to those skilled in the art of furniture construction upon reading the accompanying specification in conjunction with the accompanying drawings.

In the drawings:

Fig. 1 is a perspective front view of one embodiment of a furniture construction utilizing the principles of this invention.

Fig. 2 is a front, perspective view of an end member with the shelves separated therefrom.

Fig. 3 is a top, perspective view of the bracing and shelf-supporting web utilized in this invention.

Fig. 4 is a bottom perspective view of a right rear corner portion of one of the shelves of the furniture construction of Fig. 1 showing the connection of the shelf to the web and shelf supporting member thereat.

Fig. 5 is a cross sectional view taken along the plane V—V of Fig. 4.

Fig. 6 is a cross sectional view taken along the plane VI—VI of Fig. 1.

Fig. 7 is a cross sectional view taken along the plane VII—VII of Fig. 4.

Briefly, this invention relates to a furniture construction having a pair of upright end standards. A plurality of shelf-supporting brackets are mounted on each of the end members in corresponding positions. The brackets include a shelf-supporting surface and a pair of prongs extending inwardly from the standards and generally perpendicular thereto. The shelves utilized have depending flanges along both the front and rear edges thereof, the flanges being bent inwardly and upwardly to form generally U-shaped channels. These shelves are secured to a corresponding pair of shelf-supporting brackets with the prongs frictionally enveloped by the U-shaped channels and the shelves resting on the shelf-supporting surfaces.

Referring to the drawings, the upright end standards are designated by the reference numerals 1 and 2 (Fig. 1). Secured to each of the standards 1 and 2 are a plurality of bracing and shelf-supporting brackets 10 (Figs. 1 and 3). Secured to a corresponding pair of brackets 10 are shelves 20 (Figs. 1 and 2).

In the embodiment of this invention shown by the drawings, the upright end standards are one piece construction, having the general shape of an inverted U. A pair of these inverted U-shaped standards form the end supports for this furniture construction, being braced as next described.

A plurality of bracing and shelf-supporting brackets 10 are secured in corresponding positions on standards 1 and 2 (Figs. 1 and 2). Each of the brackets 10 are fabricated from a single piece of material, thereby giving it the attributes of strength and ease of fabrication (Fig. 3). Each bracket 10 includes a main body 11 with a pair of prongs 12 and 13, one prong extending from each end thereof, generally perpendicular to the plane of the main body 11. Holes 14 and 15 are positioned respectively in the prongs 12 and 13, and the respective ends 18 and 19 are sharpened, the purpose of which will be described hereinafter.

A flange 16 extends from the top of the main body 11 of each bracket 10. Flange 16 is offset along its length, such that a portion 17 thereof lies in the same plane as the tops of the prongs 12 and 13. The brackets 10 are secured to the upright end members 1 and 2 by placing them between the legs of the U-shaped standards with the prongs 12 and 13 extending inwardly thereof and secured to the legs of the end members. This may be done in any suitable manner, such as welding at 8 and 9 (Figs. 4 and 6). It will now be obvious that brackets 10 provide rigid braces for the end members 1 and 2 thereby producing complete, rigid end standards.

It will be noted that the brackets 10 are of one piece construction and their fabrication consists merely in severing the proper shape from a blank and bending it to form the bracket as described. The brackets 10 are mounted on the standards 1 and 2 at the situs of fabrication. Because they only slightly increase the size of the standards, the shipping package will be no bigger than if the standards 1 and 2 where shipped alone.

The shelves 20 are also fabricated from one piece of material. Each shelf has a depending flange along both its front and back edges. The ends 25 and 26 of both flanges are reversely and upwardly bent to form a pair of U-shaped channels 23 and 24 respectively (Fig. 2). The height of the U-shaped channels 23 and 24 is approximately equal to the height of the prongs 12 and 13 of brackets 10, the purpose of which will be described hereinafter.

The U-shaped channels are of a width such that they may frictionally envelope prongs 12 and 13 of brackets 10. Positioned near each end of each of the inside legs 25 and 26 is an ear 27 (Figs. 4 and 5). Ears 27 project from the inside legs 25 and 26 outwardly into the U-shaped channels and away from the ends thereof. The exact positioning and purpose of the ears will be brought forth when the assembly of this furniture construction is described.

Assembly and operation

As noted hereinbefore, the upright standards 1 and 2, the brackets 10 and the shelves 20 are all one piece construction. The brackets 10 are secured in corresponding positions to the standards 1 and 2 at the situs of fabrication. Thus, the furniture construction, as for example, the room divider shown herein, is knocked down when shipped. The package containing the component parts of the furniture construction will therefore contain the two standards, with the brackets 10 already rigidly secured thereto, along with the proper number of shelves 20. It will be readily obvious that these parts can be shipped in a flat, very compact package, thereby keeping shipping costs to a minimum. There is no wasted space as maximum compactness is achieved when packaging.

To assemble this furniture, a standard 1 or 2 is grasped with one hand and with the other hand a shelf 20 is positioned adjacent thereto. The sharpened ends 18 and 19 of prongs 12 and 13 are aligned with the U-shaped channels 23 and 24 and guided into them. As noted hereinbefore, the prongs are frictionally enveloped by the U-shaped channels 23 and 24. Firmly grasping the shelf 20, the other hand may be used to deliver a quick, sharp blow which will force the prongs 12 and 13 into the U-shaped channels 23 and 24, respectively.

The ears 27 are positioned such that they will resiliently snap into the holes 14 and 15 of prongs 12 and 13 when the prongs are fully inserted into the U-shaped channels. This is all that is required to attach one end of a shelf 20 to one of the brackets 10 on a standard. Similar steps will attach one end of each of the other shelves to the other brackets.

The other ends of the shelves 20 are attached to the corresponding brackets 10 on the other standard in the same manner.

This construction imparts long lasting rigidity and stability to furniture. The bracing and shelf-supporting brackets 10 provide a plurality of braces for the inverted U-shaped standards. Thus, the standards themselves, with the brackets 10 secured thereto, are very rigid. Because the height of the prongs 12 and 13 is approximately equal to the height of the U-shaped channels 23 and 24, vertical racking is virtually impossible. Because the width of the prongs 12 and 13 is approximately equal to that of the U-shaped channels 23 and 24, a substantial area of tight bearing is created eliminating horizontal racking.

Further, the ears 27, being snapped into the holes 14 and 15 in the prongs 12 and 13, prevent any longitudinal movement of the prongs within the U-shaped channels. In one direction, the channels bind against the standards (Fig. 5) and in the other direction the ends of the ears 27 bind against the edges of the holes 14 and 15. Thus, it will be noted that rigidity is provided to all three directions, eliminating any possibility of racking. This gives maximum rigidity to the furniture construction. Because of the nature of the various parts of this invention, this rigidity will be long lasting, as there is nothing to wear or loosen. Thus, this furniture construction is rigid when assembled and will remain so throughout its use, periodical adjustment and tightening being unnecessary.

Because of the absence of threaded fasteners in the assembly of this furniture construction, the usual problems of appearance arising therefrom are not present. In fact, it will be noted from an examination of Fig. 1 that there are no unsightly joints to advertise the fact that the furniture was not factory assembled.

When the shelves are completely assembled to the terminal brackets the ends of the shelves rest upon the offset portions 17 of flanges 16. This permits the surfaces of the shelves 20 to lie flush with the top surfaces of the flanges 16. This provides end support for the shelves preventing them from being dished.

It has been shown how this invention provides a furniture construction which may be shipped knocked down and be very quickly assembled by the purchaser. The assembling of this furniture construction is extremely easy and does not require the use of any specific tools. This invention further provides a furniture construction which is extremely rigid and will remain so throughout its use. The assembled piece of furniture is pleasing in appearance because all connections are concealed.

Although only one embodiment of this invention has been described, it is possible to practice this invention in other embodiments. All such embodiments are considered to be within the spirit and scope of this invention, unless the appended claims expressly state otherwise.

I claim:

1. A furniture construction comprising; a pair of end standards each having a pair of parallel prongs; a member for joining said standards together; said member having a generally U-shaped channel along each of a pair of its marginal edges and generally perpendicularly disposed to the plane of said member; said prongs being received in the ends of said channels and tightly frictionally engaging the walls of said channels for holding said standards to said member; an ear having a free end extending into each of said channels adjacent each of the ends thereof; said ears projecting away from said ends of said channels; a shoulder on each of said prongs engaged by said free ends of said ears when said prongs are fully received in said channels for locking said standards against separation from said member.

2. A furniture construction comprising: a pair of upright end standards; a plurality of shelf-supporting brackets mounted on each of said end standards in corresponding positions, said shelf-supporting brackets each including a shelf-supporting surface, a pair of parallel prongs extending inwardly of each of said end standards and generally perpendicular thereto, and a hole in each of said prongs; a plurality of shelves, said shelves each including depending flanges along their front and back edges, said flanges reversely bent inwardly and upwardly forming generally U-shaped channels, and an ear near each end of each of said U-shaped channels, said ears projecting inwardly into said U-shaped channels and away from the ends thereof; and said shelves secured to a corresponding pair of said shelf-supporting brackets, said prongs frictionally engaged with the walls of said U-shaped channels, said ears projecting into said holes, and said shelves resting on said shelf-supporting surfaces.

3. A furniture construction comprising: a pair of upright end standards; a plurality of shelf-supporting brackets, each of said shelf-supporting brackets having a back, a prong at each of its ends extending generally perpendicular from said back and a flange along the top of said back extending generally perpendicular to said back in the same direction as said prongs and a portion of said flange lying in the same plane as the tops of said prongs; said shelf-supporting brackets mounted in corresponding positions on said end standards such that said prongs extend inwardly from said end standards and lie generally perpendicular thereto; a plurality of shelves, each shelf having a depending flange along its front and rear edges; said depending flanges reversely bent inwardly and upwardly to form generally U-shaped channels; and said shelves secured to said corresponding shelf-supporting brackets, said prongs frictionally engaged with the walls of said U-shaped channels and said shelves resting on said portion of said top flange of said shelf-supporting brackets.

4. A furniture construction comprising: a pair of upright end standards; a plurality of shelf-supporting brackets, each of said shelf-supporting brackets having a back, a prong at each of its ends extending generally perpendicular from said back, a hole in each of said prongs and a flange along the top of said back extending generally perpendicular to said back in the same direction as said prongs and a portion of said flange lying in the same plane as the tops of said prongs; said shelf-supporting brackets mounted in corresponding positions on said end standards such that said prongs extend inwardly from said end standards and lie generally perpendicular thereto; a plurality of shelves, each shelf having a depending flange along its front and rear edges; said depending flanges reversely bent inwardly and upwardly to form generally U-shaped channels; an ear near each end of the inward leg of each of said U-shaped channels, said ears projecting inwardly into said U-shaped channels and away from the ends thereof; and said shelves secured to a corresponding pair of said shelf-supporting brackets, said prongs frictionally engaged with the walls of said U-shaped channels, said ears projecting into said holes, and said shelves resting on said portion of said top flange of said shelf-supporting brackets.

5. A furniture construction, comprising a pair of generally inverted U-shaped end standards; a plurality of bracing and shelf-supported brackets, said brackets including a main body, prongs extending from the ends thereof generally perpendicular to said body, a hole in each of said prongs, a flange along the top of said body extending in the same direction as said prongs, and a portion of said flange lying in the same plane as the tops of said prongs; said brackets mounted on said end standards such that said prongs extend inwardly thereof; a plurality of shelves, each shelf having depending flanges along its front and rear edges; each of said flanges reversely bent inwardly and upwardly forming generally U-shaped channels; the distance from the yolk of said U-shaped channel to said shelf being generally equal to the height of said prongs; ears projecting from the inner leg of each of said U-shaped channels, said ears positioned near the ends of said inner leg and projecting inwardly toward the other leg of said U-shaped channel and away from said ends; and said shelves secured to said brackets, said prongs frictionally engaged with the walls of said U-shaped channels, said ears projecting into said holes, and said shelves resting on said portions of said flanges of said brackets.

6. A bookcase construction of the character described, comprising a pair of vertical side frame members supporting a plurality of horizontal shelves between them, said side frame members being provided with horizontally extending wing elements and said shelves being provided with socket portions adapted to receive said wing elements in order to hold said side frame members and said shelves together in assembled form, said side frame members being provided with a plurality of horizontally extending angle bars secured thereto, each of said angle bars having a vertically extending component which is secured to said side frame members and having a horizontal component which fits under a shelf between its respective socket portions in order to support the shelf.

7. A furniture construction comprising: a pair of end standards each having a pair of parallel prongs; a member for joining said standards together, said member having a generally U-shaped channel along each of a pair of its marginal edges and generally perpendicularly disposed to the plane of said member, said prongs being received in the ends of said channels and tightly frictionally engaging the walls of said channels for holding said standards to said member; and interengaging means for locking said standards against separation from said member.

References Cited in the file of this patent

UNITED STATES PATENTS

| | | |
|---|---|---|
| 1,187,914 | Kirsch | June 20, 1916 |
| 1,871,972 | Fenstermaker | Aug. 16, 1932 |
| 2,315,595 | Chappory | Apr. 6, 1943 |